Patented Dec. 1, 1931

1,834,620

UNITED STATES PATENT OFFICE

ERNST HUG AND HEINRICH WERDENBERG, OF NEU-ALLSCHWIL, NEAR BASEL, SWITZERLAND, ASSIGNORS TO DURAND & HUGUENIN S. A., OF BASEL, SWITZERLAND

GALLOCYANINE DYESTUFFS

No Drawing. Application filed November 20, 1928, Serial No. 320,745, and in Germany November 26, 1927.

The present invention relates to new dyestuffs of the gallocyanine series, more particularly to compounds having in their free state the probable general formula:

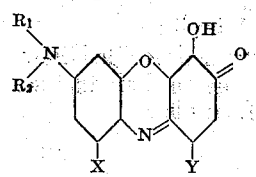

wherein X means one of the following monovalent substituents: alkyl, $NH_2$, alkyl- or acetyl-substituted $NH_2$ and $R_1$ stands for an alkyl group, $R_2$ for hydrogen or an alkyl group, Y for hydrogen or a substituent characteristic for gallocyanine dyestuffs, that is to say, a free or substituted carboxyl group, such as $CONH_2$, $CONH$ aryl and $COO$ alkyl.

The dyestuffs of the above probable formula are obtainable by reacting upon a compound of the formula:

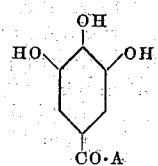

wherein A stands for a hydroxy, alkoxy, amino, or arylamino group, with a compound of the formula:

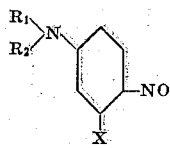

wherein the litteræ X, $R_1$ and $R_2$ have the same meaning as above, under such conditions as are usual in the manufacture of gallocyanine dyestuffs.

The products thus obtainable constitute dark powders soluble in strong sulphuric acid with blue to violet colorations, yielding bright violet to blue shades when used in printing with chrome mordants.

Compared to the corresponding well known products, which in place of X do not contain any substituent, the new dyestuffs show, in discharge printing, an increased resistance to hydrosulphite and other reducing agents.

In the U. S. patent specification No. 895,635 the dyestuff from nitrosodiethyl-meta-chloraniline and gallamide and the corresponding leuco compound are described; also in Friedländer IX, page 255, there are mentioned gallocyanine dyestuffs which result by condensation of nitrosodiethyl-meta-amino-phenol-ethers with gallic acid or derivatives thereof. But neither in one nor in the other case it is said that the dyestuffs in question withstand hydrosulphite.

In any case, from these two publications, the new technical effect of the present invention cannot be concluded, namely the fact that gallocyanine dyestuffs which are derived from a meta-substituted alkyl-aniline and which therefore have a substituent in meta position with respect to the alkylamino group, withstand hydrosulphite and other reducing agents better than gallocyanine dyestuffs, which in the said position have no substituent.

For printing purposes it will often be advantageous to previously transform the new dyestuffs into the corresponding leuco derivatives (in view of their better solubility), for example by means of zinc and hydrochloric acid, which leuco compounds are easily reoxidized on the fibre; and it is to be understood that also these leuco derivatives are within the scope of the present invention.

The following examples will illustrate the invention, without limiting it thereto, the parts being by weight:

Example 1

In 500 parts of methyl alcohol, 20,6 parts of gallic acid and a quantity of the naphthalene disulphonic salt of nitrosodiethyl-meta-toluidine which corresponds to 34,6 parts of the nitroso compound of 100 per cent strength are heated to boiling until the nitroso compound has disappeared. The dyestuff, which separates after cooling, is filtered off and washed with alcohol and water. It forms a crystalline powder which is somewhat soluble in alcohol and less soluble in water, dissolving in concentrated sulphuric acid with a blue coloration. In its free state it probably corresponds to the formula:

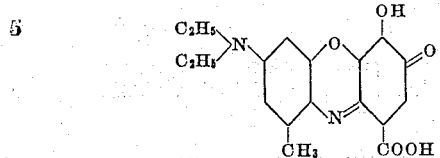

When printed upon cotton with chrome mordants it yields bright violet shades showing satisfactory fastness to hydrosulphite under the conditions of discharge printing.

*Example 2*

A mixture of 54 parts of nitrosomonoethyl-meta-toluidine hydrochloride, 25 parts of gallamide and 300 parts of methyl alcohol is boiled until no more nitroso compound is present. The dyestuff thus obtained is sparingly soluble in water and alcohol. The shade of its solution in concentrated sulphuric acid is violet. When printed upon cotton with chrome mordants it yields bright red-violet shades showing satisfactory fastness to hydrosulphite under the conditions of discharge printing.

Especially strong shades of the same dyestuff can be obtained by reducing it to its leuco compound, for instance by means of zinc and hydrochloric acid, and using this leuco compound in the printing process, re-oxidation taking place on the fibre.

Whilst the isomeric dyestuff (nitrosomonoethyl-orthotoluidine + gallamide) shows in discharge printing an alteration of its shade to the blue side, the present dyestuff does, under the same condition, hardly change its shade at all.

*Example 3*

From 60 parts of gallic acid and 100 parts of nitrosodimethyl-meta-toluidine in 600 parts of methyl alcohol a gallocyanine dyestuff is prepared in the usual way, which owing to its free carboxylic group is soluble in diluted alkali. This dyestuff is, for instance according to the process described in U. S. Patent Specification No. 863,907, transformed by reducing and splitting off of the carboxylic acid group into the leuco-compound of the corresponding gallocyanine derived from pyrogallol. (This latter in oxidized form is insoluble in dilute alkali.)

While the dyestuff from nitrosodimethylaniline and gallic acid (wherein the carboxylic group has been split off and which has been reduced) is wholly unsuitable for discharge printing, as it gives, owing to decomposition, weak, dull shades, the present dyestuff gives, under the same conditions, in discharge printing the same bright violet shades as in direct printing.

As further examples the following dyestuffs may be mentioned, which all show a good resistance to hydrosulphite:

The dyestuff which is obtained by heating the gallocyanine prepared according to Example 1 (nitrosodiethyl-meta-toluidine + gallic acid) in an alkaline solution whereby the carboxylic group is split off, and which, for use in printing, may be advantageously reduced;

The gallocyanine dyestuff obtainable by the action of nitrosotetramethyl-meta-phenylenediamine on gallamide, yielding in chrome printing bluish-violet shades of good fastness to chlorine and soap;

The dyestuff from 1-dimethylamino-3-acetylamino-4-nitrosobenzene and gallamide. It dissolves in sulphuric acid of 60° Bé. with a reddish violet coloration, which changes to blue-violet after saponification of the acetylamino group.

What we claim is:

1. The herein described new gallocyanine dyestuffs having in their free state the probable general formula:

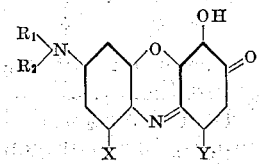

wherein X means one of the following monovalent substituents: alkyl, $NH_2$, alkyl- or acetyl-substituted $NH_2$; $R_1$ stands for an alkyl group, $R_2$ for hydrogen or an alkyl group, and Y for hydrogen, a free carboxyl group or one of the following substituted carboxyl groups; $CONH_2$, CONH aryl and COO alkyl, said products constituting valuable dyestuffs for discharge printing, yielding bright violet to blue shades when printed with chromium mordants and being usable in form of their leuco derivatives.

2. The herein described new gallocyanine dyestuffs having in their free state the probable general formula:

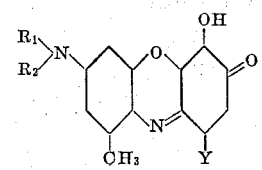

wherein $R_1$ stands for an alkyl group, $R_2$ for hydrogen or an alkyl group and Y for hydrogen, a free carboxyl group or one of the following substituted carboxyl groups; $CONH_2$, CONH aryl and COO alkyl, said products constituting valuable dyestuffs for discharge printing, yielding bright violet to blue shades when printed with chromium mordants and being also usable in form of their leuco derivatives.

3. The herein described new gallocyanine dyestuffs having in their free state the probable formula:

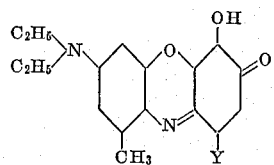

wherein Y stands for hydrogen, a free carboxyl group or one of the following substituted carboxyl groups: $CONH_2$, $CONH$ aryl and $COO$ alkyl, said products constituting valuable dyestuffs for discharge printing, yielding bright violet to blue shades when printed with chromium mordants and being also usable in form of their leuco derivatives.

4. The herein described new gallocyanine dyestuffs having in its free state the probable formula:

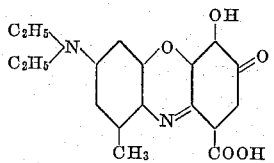

being valuable in discharge printing, yielding a bright blue violet shade when printed with chromium mordants and being also usable in form of its leuco derivative.

In witness whereof we have hereunto signed our names this 8th day of November 1928.

ERNST HUG.
HEINRICH WERDENBERG.